United States Patent [19]

Mössinger et al.

[11] Patent Number: 5,059,111
[45] Date of Patent: Oct. 22, 1991

[54] APPARATUS FOR PROCESSING UNVULCANIZED RUBBER

[75] Inventors: Jürgen Mössinger, Burgwedel; Siegfried Stein; Max Stephan, both of Garbsen; Ralf Feierabend, Seelze, all of Fed. Rep. of Germany

[73] Assignee: Continental Aktiengesellschaft, Hanover, Fed. Rep. of Germany

[21] Appl. No.: 427,446

[22] Filed: Oct. 26, 1989

[30] Foreign Application Priority Data

Nov. 2, 1988 [DE] Fed. Rep. of Germany ....... 3837197

[51] Int. Cl.$^5$ .................... B29B 11/02; B29C 59/04
[52] U.S. Cl. ................................. 425/294; 425/316; 425/335; 425/363; 425/394; 425/449
[58] Field of Search ............... 425/201, 202, 204, 206, 425/209, 294, 311, 313, 315, 316, 335, 363, 336, 394, 396, 449

[56] References Cited

U.S. PATENT DOCUMENTS

| 503,230 | 8/1893 | Dobyns | 425/294 |
| 625,739 | 5/1899 | Buerk | 425/294 |
| 2,165,718 | 7/1939 | Mun | 425/294 |
| 2,543,307 | 2/1951 | Swallow et al. | 425/201 |
| 4,468,186 | 8/1984 | Sollich | 425/294 |
| 4,725,217 | 2/1988 | Nitta et al. | 425/335 |

FOREIGN PATENT DOCUMENTS

| 3811328 | 10/1989 | Fed. Rep. of Germany . | |
| 62-93099 | 4/1987 | Japan | 425/294 |

*Primary Examiner*—James C. Housel
*Attorney, Agent, or Firm*—Robert W. Becker & Associates

[57] ABSTRACT

An apparatus for processing unvulcanized rubber utilizing intermeshing grooved rollers. To obtain rubber material having an optimally jagged surface, at least the cutting disks of one of the grooved rollers are additionally provided with teeth.

1 Claim, 2 Drawing Sheets

APPARATUS FOR PROCESSING UNVULCANIZED RUBBER

BACKGROUND OF THE INVENTION

The present invention relates to an apparatus for processing unvulcanized rubber that at the end should be in the form of sheets or strips having a jagged surface for supply to mixing units, utilizing intermeshing grooved rollers (serrated shafts).

In an older German patent application (DE 38 11 328 A1), a method is described for supplying polymers to mixing units (internal mixers and calendars) where in order to even out the charging behavior, polymers are supplied that are in the form of sheets or strips having a surface that is jagged and is provided with recesses, whereby the length of the strips is considerably greater than their width and thickness. In the aforementioned patent application, the apparatus for producing the polymer strips is in the form of an extruder having a perforated disk. However, it has been shown that it is not possible with such an apparatus to optimally provide a jagged surface for the strips.

It is therefore an object of the present invention to provide an apparatus with which unvulcanized strips of polymer can be produced that are optimally provided with a jagged surface structure, and which permits high throughputs.

SUMMARY OF THE INVENTION

This object is realized with an apparatus of the aforementioned type if in addition the cutting disks of at least one of the grooved rollers are provided with teeth.

The present invention offers the advantage that, depending upon the size and arrangement of the serrated shafts, different feeding or charging variations are possible. Thus, for example, synthesis balls of the conventional dimensions 200×400×600 mm, or also unvulcanized rubber in the form of individual sheets of varying thickness, can be supplied, and in particular at the same time a plurality of superimposed sheets could also be supplied. Furthermore, mixture sheets can be supplied individually or multiply in finite or endless form. Finally, a charging with NK-balls of various size qualities, and a continuous supply of nonuniform rubber pieces, is also possible. Via a selection of the width of the cutting teeth disks of the grooved rollers, the desired strip width of the rubber strips can be achieved. By varying the air gap between the grooved rollers, by a selection of the diameters of the grooved rollers, i.e. of the diameters of the cutting teeth disks and the friction disks, as well as by the type of teeth and the rotational speed of the grooved rollers, the type of jagged configuration of the surfaces can be varied over a wide range during the production of the polymer strips.

The inventive apparatus essentially comprises two intermeshing grooved rollers and a common drive for both rollers. Naturally, if necessary, two separate drives could also be provided, or to produce different rotational speeds appropriate gear means can be connected ahead of the rollers. The main concept of the invention is to use a grooved roller unit, which is known for cutting other materials, to cut unvulcanized rubber, and in addition to provide the cutting disks of the grooved rollers with teeth in order to obtain cut material strands that are provided with a jagged surface. In principle, not only the cutting disks with the larger diameter but also the disks with the smaller diameter could be provided with teeth; however, for manufacturing reasons, merely that region of the grooved rollers having the larger cutting disks is provided with teeth.

BRIEF DESCRIPTION OF THE DRAWINGS

One exemplary embodiment of the present invention will be explained subsequently in conjunction with the drawing, in which.

DESCRIPTION OF PREFERRED EMBODIMENTS

Figure 1:
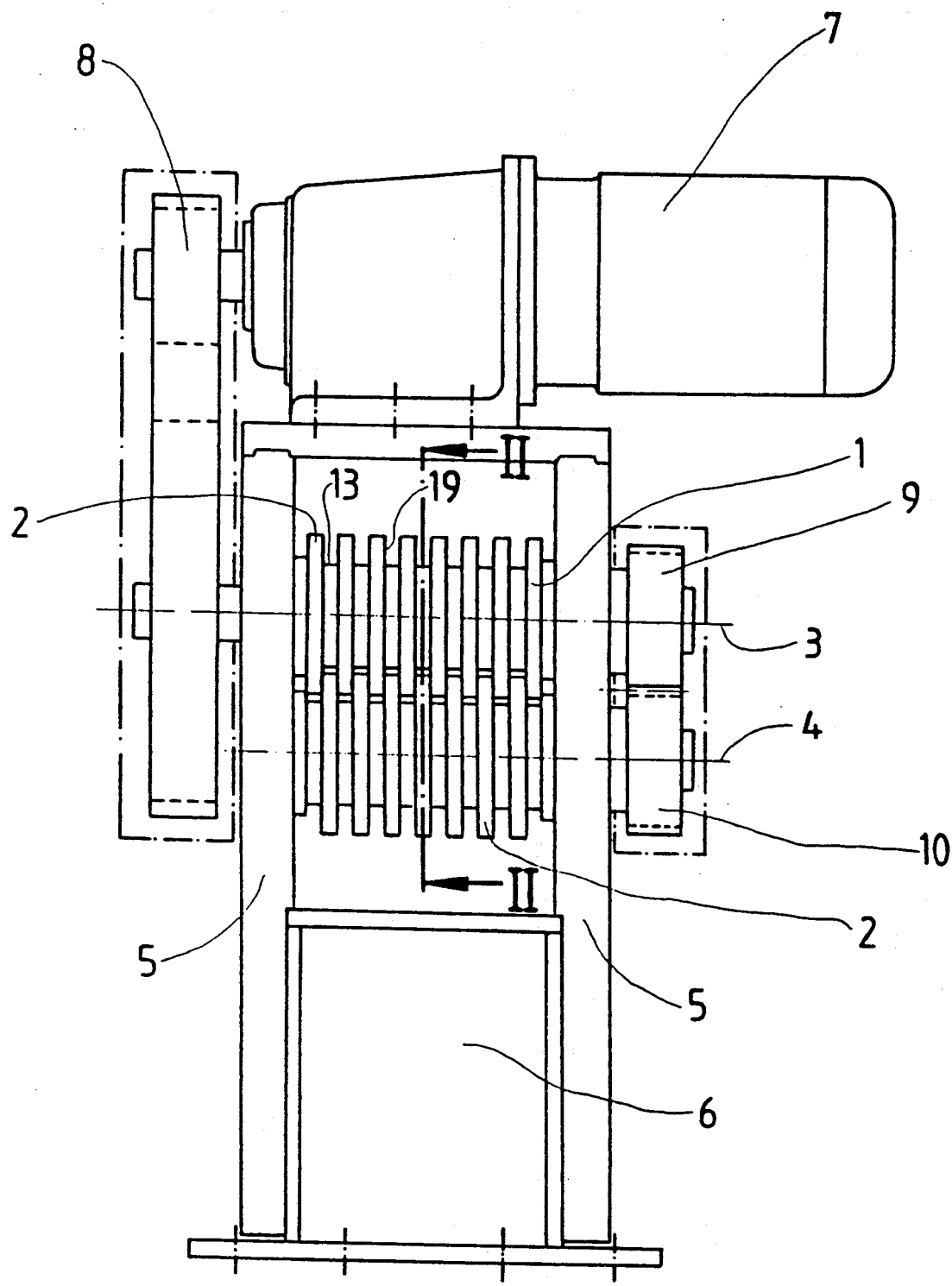
FIG. 1 is a side view of an apparatus for processing unvulcanized rubber.

The apparatus illustrated in FIG. 1 essentially comprises two intermeshing grooved rollers 1 and 2 that are in the form of cutter teeth or serrated shafts, with the axes or shafts 3, 4 of the rollers being mounted in support frames 5 of a housing 6. The two grooved rollers 1, 2 are driven in common by a motor 7 via a gear chain drive 8 and gear wheels 9, 10.

Each of the two grooved rollers 1, 2, in the region of the outer surface thereof, has a geometrical configuration, with cutting teeth disks 12, which are provided with teeth 11 and have a larger diameter, alternating with friction disks 13 (without teeth) having a smaller diameter. The teeth 11 are preferably in the form of a ground blade section. The diameter of the grooved rollers 1, 2 in the region of the larger cutting teeth disk 12 can be between 200 and 800 mm, and in a preferred embodiment is about 300 mm. Between 30 and 300 teeth 11, preferably approximately 50 teeth, can be provided on the cutting teeth disks 12, whereby the depth of the teeth should be approximately between 3 and 10 mm. The diameter of the grooved rollers 1, 2 in the region of the friction disks 13 should be approximately 60 to 200 mm less than that of the cutting teeth disks 12, and in a preferred embodiment is approximately 80 mm less. Disposed between the two grooved rollers 1, 2, i.e. exactly between a cutting teeth disk 12 of one grooved roller and the adjacent friction disk 13 of the other grooved roller, is an air gap 14 that can be 1 to 10 mm, and is preferably in a range of between 2 and 4 mm. The air gap 14 should be variable, via an ability to shift one of the two grooved rollers 1, 2, in order to be able to be optimally adjusted for varying properties and thicknesses of material. In the illustrated embodiment, in which the two grooved rollers 1, 2 have the same diameter, the common drive is effected via a three-phase motor of approximately 30 KW and 67 rpm. Following the grooved rollers 1, 2 are two doctor blades 15.

Figure 2:
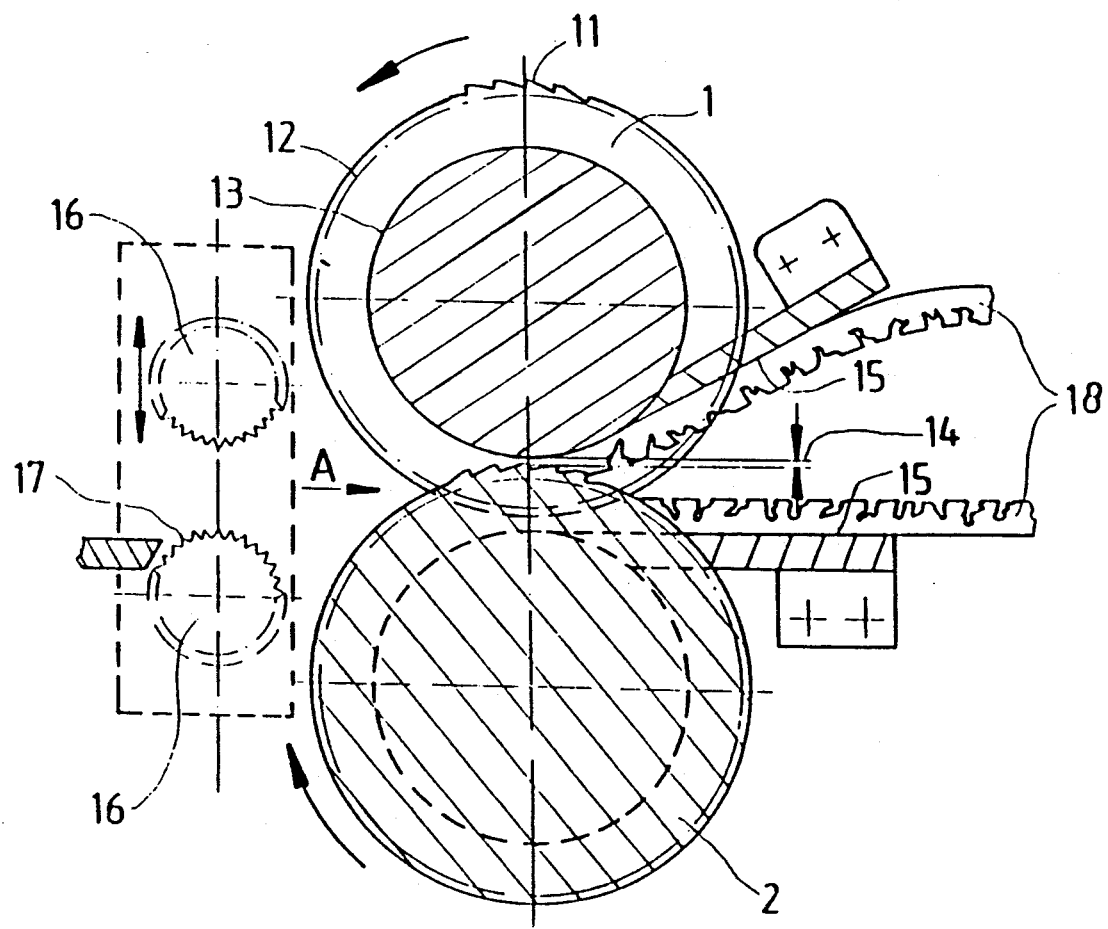
FIG. 2 is a radial cross-sectional view of the two grooved rollers of FIG. 1 through the plane II—II.

In the event that the unvulcanized rubber is to be supplied in the form of long sheets, and furthermore is to be given a desired length, the apparatus described above can have two feed rollers 16 disposed upstream of the grooved rollers 1, 2, as shown in the dashed-line region of FIG. 2. In order to be able to grippingly engage the rubber material, the feed rollers 16 are provided with serrations 17.

The manner of operation of the apparatus illustrated in FIG. 2 will be explained subsequently. With the grooved rollers 1, 2 rotating, unvulcanized rubber material is supplied at A in such a width that corresponds at most to the width of the grooved rollers. The material should preferably be supplied in such lengths that already approximately correspond to the desired length of the rubber sheets or strips 18. By means of the preferably vertical sides 19 of the cutting teeth disks 12 and the friction disks 13 (if necessary, the sides 19 can also have a different configuration), the rubber material is cut into strips 18 of a particular width, with these strips at the same time being provided by the teeth 11 with a jagged surface.

The feed rollers 16 of FIG. 2 are used for processing long sheets or rubber balls. With these feed rollers, the material is introduced into the gap 14 between the groove rollers 1, 2. By stopping or reversing the feed rollers 16, the material is torn off or separated. In this way, the desired length of the rubber strips 18 is produced.

The rake-like doctor blades 15 assure that the strips 18 cannot rotate between the cutting teeth disks 12 and at the same time are conveyed in the desired direction.

It should be noted that within the scope of the present invention, the phrase "the teeth 11" is used very generally to also encompass other configurations for providing the grooved rollers 1, 2 with raised portions and recesses for providing the rubber material with a jagged configuration.

The present invention is, of course, in no way restricted to the specific disclosure of the specification and drawings, but also encompasses any modifications within the scope of the appended claims.

We claim:

1. An apparatus for processing unvulcanized rubber that after being processed is in the form of strips having a jagged surface for supplying to mixing units, said apparatus including intermeshing grooved rollers, the improvement wherein:

each of said intermeshing grooved rollers is provided with cutting disks, with said cutting disks of a first one of said intermeshing grooved rollers intermeshing with respective grooves of a second one of said intermeshing grooved rollers and with said cutting disks of said second intermeshing grooved roller intermeshing with respective further grooves of said first intermeshing grooved roller, and with the cutting disks of at least one of said grooved rollers being provided with teeth; and two feed rollers are disposed upstream of said grooved rollers and are provided with serrations.

* * * * *